United States Patent
Simmons et al.

(10) Patent No.: US 10,083,713 B1
(45) Date of Patent: Sep. 25, 2018

(54) HEAT-ASSISTED MAGNETIC RECORDING (HAMR) WRITE HEAD WITH PROTECTIVE MULTILAYER FILM FOR NEAR-FIELD TRANSDUCER

(71) Applicant: Western Digital Technologies, Inc., San Jose, CA (US)

(72) Inventors: Randall George Simmons, San Jose, CA (US); Cherngye Hwang, San Jose, CA (US); Dung Thi Nguyen, San Jose, CA (US); Mousumi Mani Biswas, Redwood City, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/678,907

(22) Filed: Aug. 16, 2017

(51) Int. Cl.
*G11B 5/255* (2006.01)
*G11B 5/31* (2006.01)
*G11B 5/40* (2006.01)
*G11B 5/60* (2006.01)
*G11B 5/00* (2006.01)
*G11B 5/127* (2006.01)

(52) U.S. Cl.
CPC .......... *G11B 5/3106* (2013.01); *G11B 5/255* (2013.01); *G11B 5/314* (2013.01); *G11B 5/3163* (2013.01); *G11B 5/40* (2013.01); *G11B 5/6088* (2013.01); *G11B 5/1278* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,433,965 B1 * | 8/2002 | Gopinathan et al. | G11B 5/6005 360/235.4 |
| 8,449,995 B2 * | 5/2013 | Gong et al. | C23C 14/025 427/580 |
| 8,871,366 B2 * | 10/2014 | Gong et al. | C23C 14/025 427/580 |
| 8,902,720 B1 | 12/2014 | Schreck et al. | |
| 9,036,307 B1 | 5/2015 | Hoshiya et al. | |
| 9,412,402 B2 | 8/2016 | Cheng et al. | |
| 9,552,833 B2 | 1/2017 | Cheng et al. | |
| 2006/0077593 A1 * | 4/2006 | Ueda | G11B 5/40 360/235.1 |
| 2015/0131416 A1 | 5/2015 | Huang et al. | |
| 2016/0275974 A1 | 9/2016 | Cheng et al. | |

* cited by examiner

*Primary Examiner* — Craig A. Renner
(74) *Attorney, Agent, or Firm* — Thomas R. Berthold (57) ABSTRACT

A heat-assisted magnetic recording (HAMR) head has a protective multilayer confined to a window of the disk-facing surface of the slider that surrounds the near-field transducer (NFT) end and write pole end. The protective multilayer is made up of alternating films of a metal and diamond-like carbon (DLC). All of the metal films are formed of the same metal selected from Ti, Zr, Hf, V, Nb, Ta, Cr, Mo and W, with the preferred metal being zirconium (Zr). A slider protective overcoat may be formed over the entire disk-facing surface in both the window region and the non-window region, with the protective multilayer formed on the slider overcoat in the window region. The overcoat may be absent in the window region, in which case an adhesion film is on the NFT and write pole ends in the window region, with the protective multilayer being formed on the adhesion film.

29 Claims, 9 Drawing Sheets

HEAT-ASSISTED MAGNETIC RECORDING (HAMR) WRITE HEAD WITH PROTECTIVE MULTILAYER FILM FOR NEAR-FIELD TRANSDUCER

TECHNICAL FIELD

This invention relates generally to a heat-assisted magnetic recording (HAMR) disk drive, in which data are written while the magnetic recording layer on the disk is at an elevated temperature, and more specifically to an improved HAMR write head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording layer, located a subwavelength distance from the first element. A head carrier or slider supports the NFT and the write head, with the NFT and write pole having ends located at the surface of the slider that faces the recording layer. A protective slider overcoat is formed on the recording-layer-facing surface over the NFT and write pole ends and serves as the gas-bearing surface (GBS) of the slider. The slider also supports the read head and rides above the disk surface on a cushion of gas, which is typically air or helium.

NFTs are typically formed of a low-loss metal (e.g., Au, Ag, Al, Cu) shaped in such a way to concentrate surface charge motion at a notch or tip located at the slider GBS when light is incident. Oscillating tip charge creates an intense near-field pattern that heats the recording layer on the disk. The magnetic write pole is then used to change the magnetization of the recording layer while it cools. Sometimes the metal structure of the NFT can create resonant charge motion (surface plasmons) to further increase intensity and disk heating. For example, when polarized light is aligned with an E-antenna type of NFT, an intense near field pattern is created at the notch or tip of the E-antenna. Resonant charge motion can occur by adjusting the E-antenna dimensions to match a surface plasmon frequency to the incident light frequency. A NFT with a generally triangular output end, sometimes called a "nanobeak" type of NFT, is described in U.S. Pat. No. 8,705,325 B2 and U.S. Pat. No. 8,705,327 B2, both assigned to the same assignee as this application. In this type of NFT an evanescent wave generated at a surface of the waveguide couples to surface plasmons excited on the surface of the NFT and a strong optical near-field is generated at the apex of the triangular output end.

SUMMARY

It has been discovered that the reliability of the NFT is much worse under actual recording conditions on a disk than under similar optical power in vacuum or ambient air conditions. This may be due to degradation or oxidation of the protective slider overcoat, which is formed of amorphous diamond-like carbon (DLC). It may also be due to "back-heating" of the NFT because of slider-disk frictional heating, conduction from the disk and/or the accumulation of carbonaceous material near the NFT. To address this problem, a protective layer confined to a window of the recording-layer-facing surface has been proposed to cover the NFT end and write pole end. U.S. Pat. No. 8,902,720 B1, assigned to the same assignee as this application, describes a HAMR write head with a protective layer in the window region formed of various oxides or nitrides.

What is needed is a HAMR head with a protective layer over the NFT that adheres to the NFT material, is transparent to radiation at the wavelength of the laser, and is resistant to degradation and corrosion at high temperature and in the presence of oxygen and moisture.

Embodiments of this invention relate to a HAMR head with an improved protective multilayer confined to a window of the disk-facing surface of the slider that surrounds the NFT end and write pole end. The protective multilayer is made up of alternating films of a metal and diamond-like carbon (DLC). All of the metal films are formed of the same metal selected from Ti, Zr, Hf, V, Nb, Ta, Cr, Mo and W, with the preferred metal being zirconium (Zr). The multilayer has at least two metal films, with the outermost film preferably being a metal film. In one embodiment the slider protective overcoat is formed over the entire disk-facing surface and thus covers both the window region and the non-window region. The multilayer is thus formed on the slider protective overcoat in the window region. In another embodiment the slider protective overcoat and its undercoat are only in the non-window region of the disk-facing surface and have been removed in the window region. An adhesion film is formed over the NFT and write pole ends in the window region, with the protective multilayer being formed on the adhesion film.

For a fuller understanding of the nature and advantages of the present invention, reference should be made to the following detailed description taken together with the accompanying figures.

DETAILED DESCRIPTION

Figure 1:
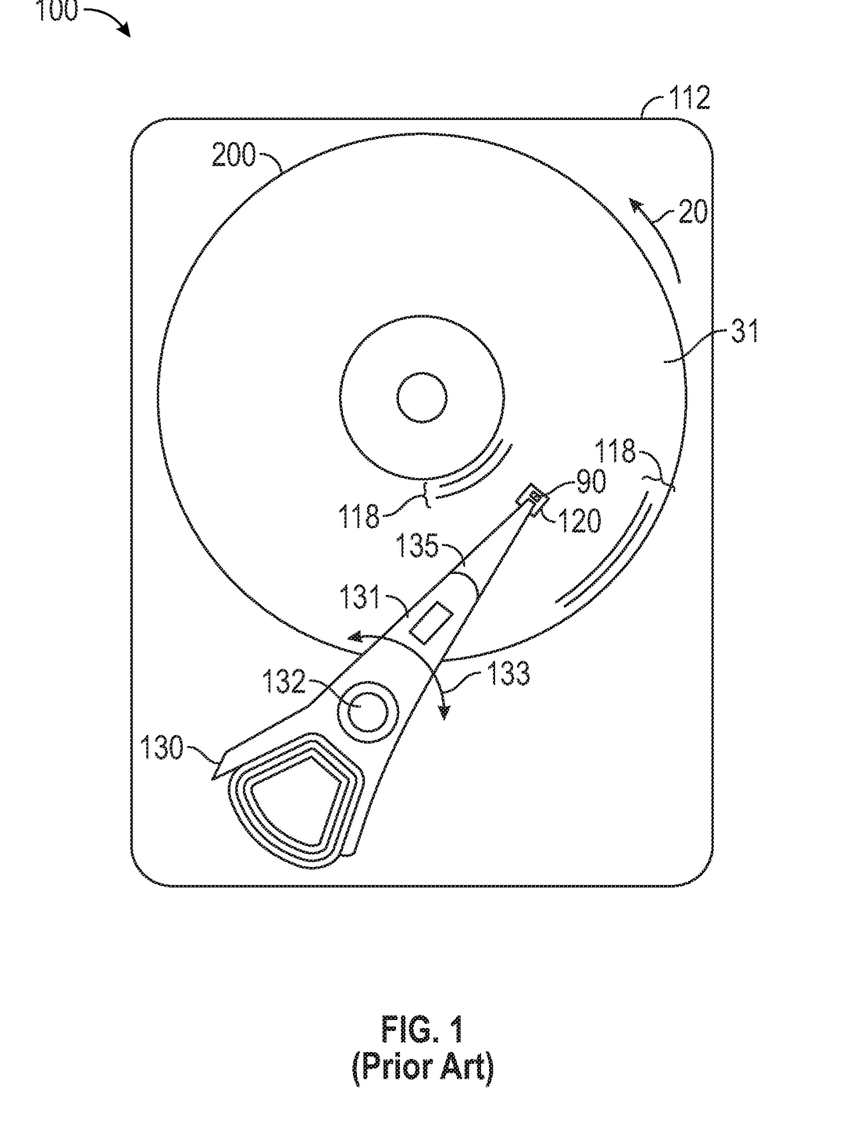
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor (not shown) for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
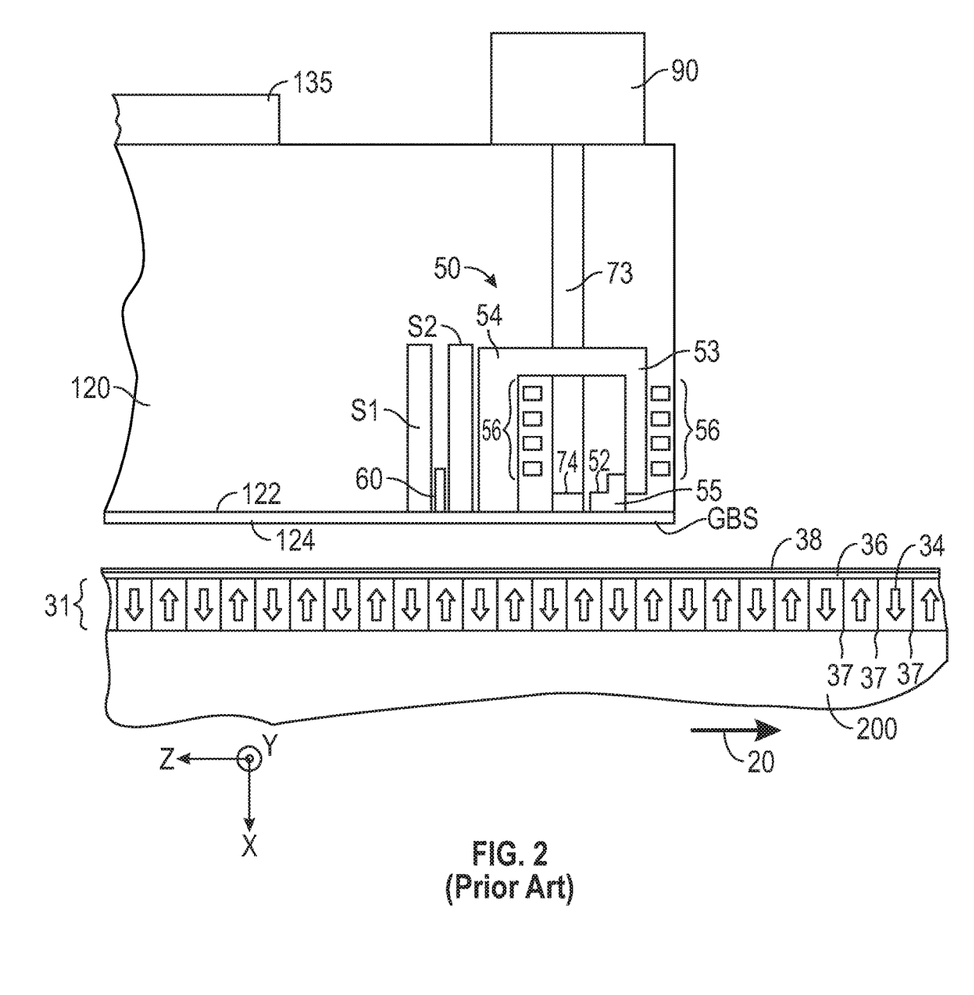
FIG. 2 depicts a sectional view, not drawn to scale because of the difficulty in showing the very small features, of an air-bearing slider for use in HAMR disk drive and a portion of a HAMR disk according to the prior art.

In the following drawings, the X direction denotes a direction perpendicular to the air-bearing surface (GBS) of the slider, the Y direction denotes a track width or cross-track direction, and the Z direction denotes an along-the-track direction. FIG. 2A is a schematic cross-sectional view illustrating a configuration example of a HAMR head according to the prior art, which is also capable of functioning as the HAMR head in embodiments of this invention. In FIG. 2A, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the GBS of the slider 120. An optional adhesion undercoat (not shown), such as a 1 to 5 Å silicon (Si) or a silicon nitride (SiNx) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120.

The laser 90 is typically capable of operating at different power levels. Materials that ensure a refractive index of the waveguide 73 core material to be greater than a refractive index of the cladding material may be used for the waveguide 73. The waveguide 73 that delivers light to NFT 74 is preferably a single-mode waveguide.

The reliability of the NFT is much worse under actual recording conditions on a disk than under similar conditions in vacuum or ambient air. This is believed to be due to accelerated oxidation of the slider DLC overcoat due to the high gas pressure (20 or more atmospheres) generated at the GBS by the high disk rotational speed (5-15 kRPM), or by "back-heating", i.e., heating of the NFT as a result of slider-disk frictional heating, conduction from the disk and/or the accumulation of opaque carbonaceous material near the NFT. Back-heating can cause diffusion of the NFT metal until the NFT tip rounds and recording degrades.

Embodiments of this invention protect the NFT with a protective multilayer confined to a window of the disk-facing surface of the slider that surrounds the NFT and write pole ends. The protective multilayer is made up of alternating films of a metal and diamond-like carbon (DLC). All of the metal films are formed of the same metal selected from Ti, Zr, Hf, V, Nb, Ta, Cr, Mo and W, with the preferred metal being zirconium (Zr). The multilayer has at least two metal films, with the outermost film preferably being a metal film. In one embodiment the slider protective overcoat is formed over the entire disk-facing surface and thus covers both the window region and the non-window regions. The multilayer is thus formed on the slider protective overcoat in the window region. In another embodiment the slider protective overcoat and its undercoat have been removed in the window region, and an adhesion film is formed over the NFT and write pole ends in the window region, with the protective multilayer being formed on the adhesion film.

Figure 3A:
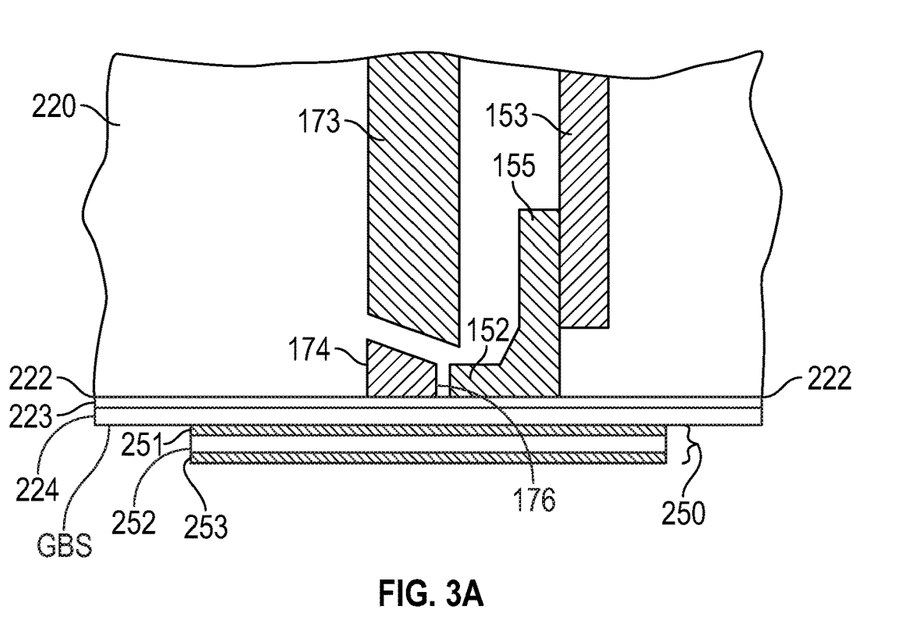
FIG. 3A is a cross-sectional view of a portion of the slider and FIG. 3B is a gas-bearing surface (GBS) view of the slider with the protective multilayer on the disk-facing surface of the slider according to an embodiment of the invention.
Figure 3B:
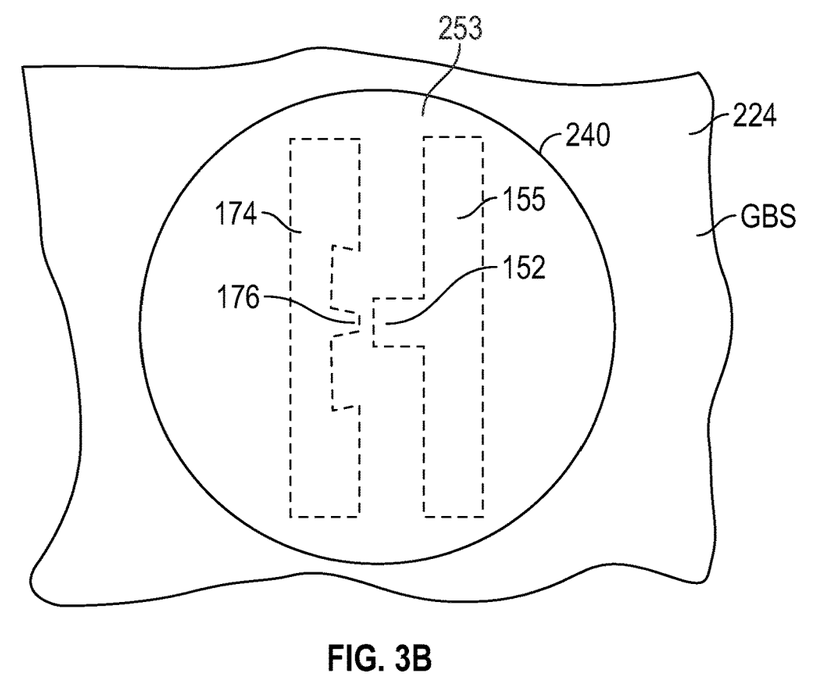

FIG. 3A is a cross-sectional view of a portion of the slider and FIG. 3B is a GBS view of the slider according to an embodiment of the invention. The slider 220 has a surface 222 that faces the recording layer on the disk. The slider supports the waveguide 173, NFT 174, main pole 153 and write pole 155 with write pole end 152. The NFT 174 in this example is an E-antenna with a central tip 176 that faces the write pole end 152. In this example the write pole end 152 is a lip that extends from the write pole 155 at the disk-facing surface 222. The disk-facing surface 222 includes a window region 240 (FIG. 3B) that surrounds both the NFT 174 and write pole end 152. The slider protective overcoat 224, which is typically DLC, is formed on the disk-facing surface 222 in both the window region 240 and the region outside the window region 240. An undercoat 223, such as a silicon (Si) or a silicon nitride (SiNx) film, functions to improve the adhesion of the protective overcoat 224. The protective multilayer 250 is formed on the slider overcoat 224 only in the window region 240 and includes alternating films of metal and DLC, e.g., in this example metal film 251, DLC film 252 and outer metal film 253.

Figure 4A:
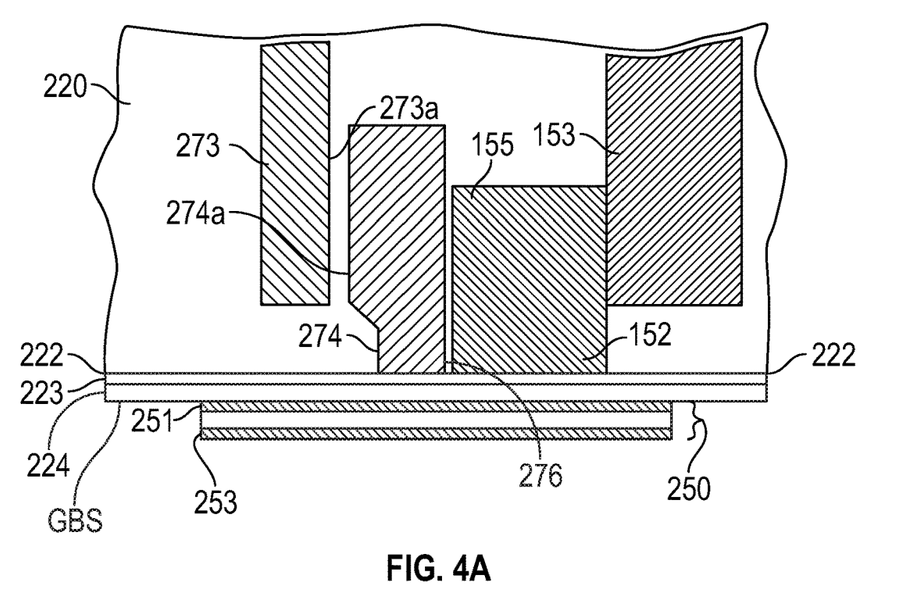
FIG. 4A is a cross-sectional view of a portion of the slider and FIG. 4B is a GBS view of the slider with the protective multilayer on the disk-facing surface of the slider according to an embodiment of the invention wherein the near-field transducer (NFT) is a "nanobeak" type NFT with a triangular end with an apex of the triangle forming the NFT tip that faces the write pole end.
Figure 4B:
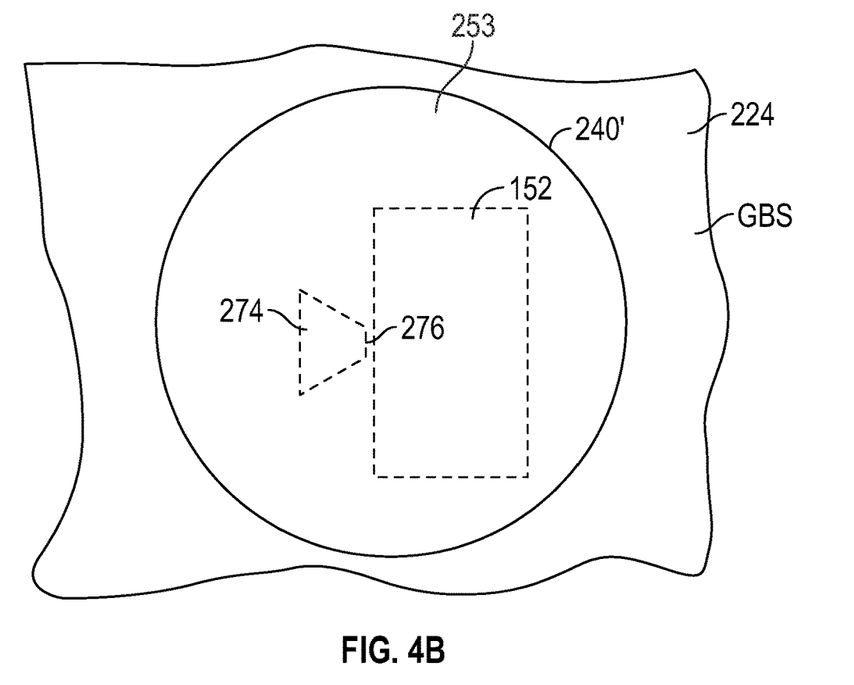

FIGS. 4A-4B illustrate an embodiment wherein the NFT 274 is a "nanobeak" type NFT with a triangular end with an apex of the triangle forming the NFT tip 276 that faces the write pole end 152. In this example, the write pole end 152 does not extend as a lip from the write pole 155. In this type of NFT, the waveguide 273 has a surface 273a that faces a surface 274a of NFT 274. When light is introduced into the waveguide 273, an evanescent wave is generated at the surface 273a and couples to surface plasmons excited on the surface 274a of NFT 274. The surface plasmons propagate to the output tip 276. The protective multilayer 250 is formed on the slider protective overcoat 224 only in the window region 240' that surrounds the NFT 274 end and write pole end 152.

In all of the embodiments, the window is depicted as being circular but could have other shapes, provided it covers both the NFT and write pole ends. Preferably the window would not be so large as to also cover the read head (item 60 in FIG. 2). If circular, it could, for example, have a diameter of approximately 3 µm, which would not affect the read head that is typically about 5 µm from the write pole end.

Figure 5A:
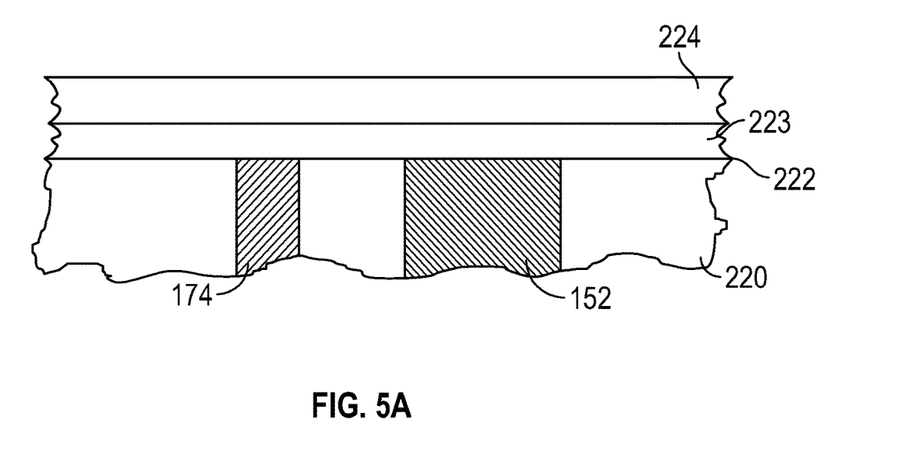
FIGS. 5A-5D are sectional views illustrating the basic process steps in forming the protective film according to an embodiment of the invention wherein the slider overcoat remains in the window region.
Figure 5B:
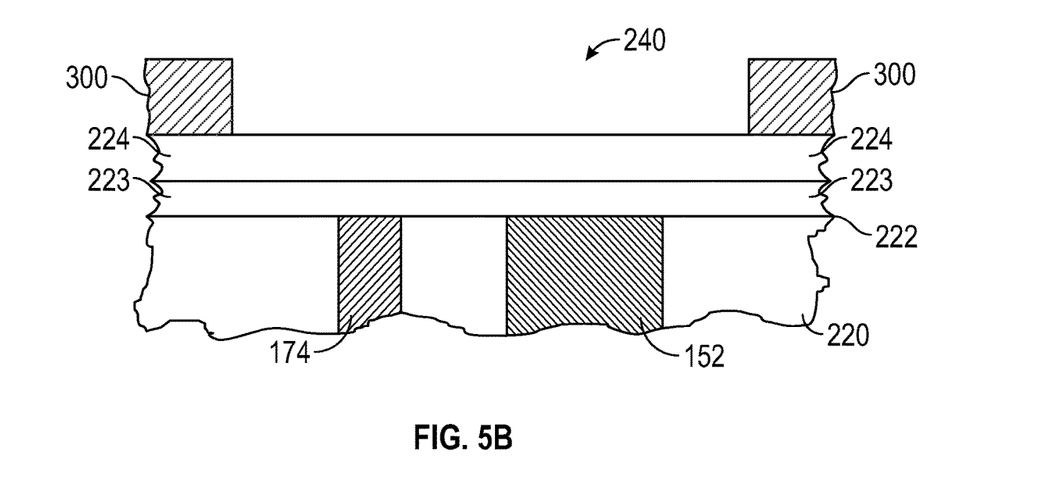
Figure 5C:
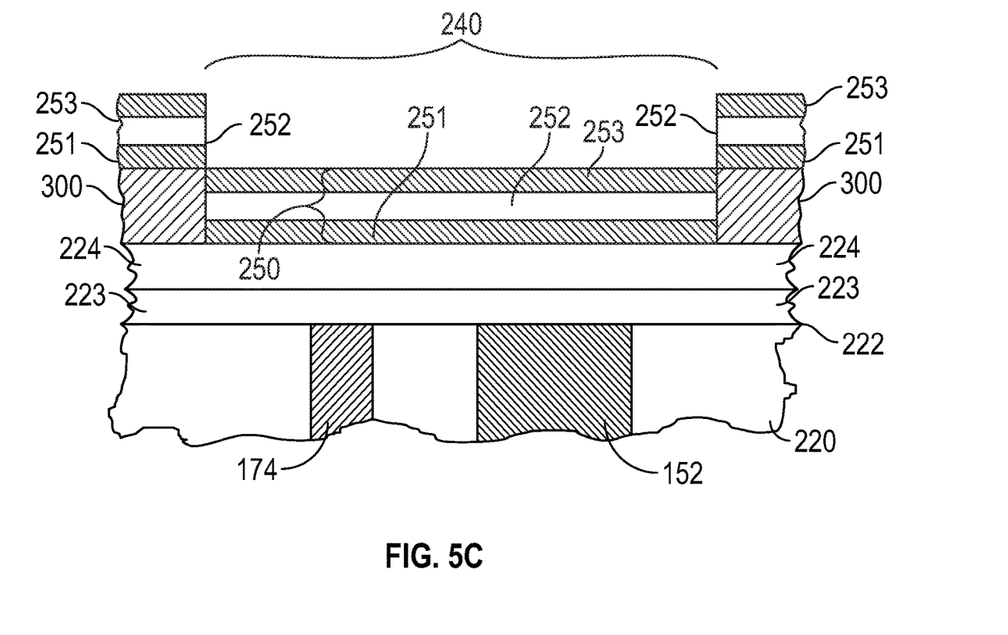
Figure 5D:
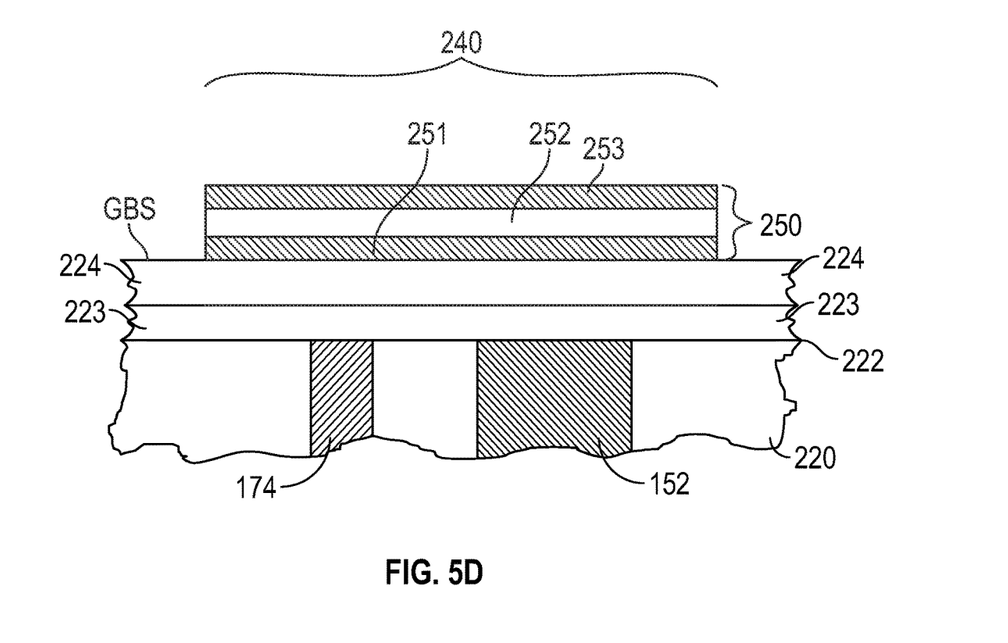

FIGS. 5A-5D are sectional views illustrating the basic process steps in forming the protective multilayer according to an embodiment of the invention wherein the slider overcoat remains in the window region. In FIG. 5A, a silicon or silicon nitride undercoat 223 and an amorphous DLC overcoat 224 have been deposited over the entire surface 222 of slider 220. The undercoat 223 may have a thickness between about 1 and 5 Å and the DLC overcoat 224 may have a thickness between about 10 and 20 Å. In FIG. 5B, a resist 300 has been patterned and developed on overcoat 224 to define the window region 240. The resist may be a liquid resist deposited by spin-coating. In FIG. 5C, metal, e.g., Zr, and DLC films are successively deposited, as depicted by Zr film 251, DLC film 252 and outer Zr film 253. The metal films may be deposited by sputter deposition or ion beam sputter deposition. The DLC films may be deposited by sputter deposition or cathodic arc sputter deposition. In FIG. 5D, the resist 300 and overlying metal and DLC material has been removed. The protective multilayer 250 extends beyond the GBS of slider 220 so that both the slider overcoat 224 and protective multilayer 250 provide protection for the NFT end 174. Only two metal films and one DLC film are depicted in multilayer 250 in FIG. 5D; however, there may be three or more metal films and two or more DLC films in the multilayer 250. Preferably the outermost film i.e., the film furthest from disk-facing surface 222, is a metal film, but alternatively the alternating films may be arranged so that a DLC film is the outermost film. Each metal film has a thickness preferably between about 1 and 5 Å. At these small thicknesses the metal film may be a discontinuous film of Zr clusters or islands. Each DLC film has a thickness preferably between about 8 and 15 Å.

Following the deposition of the films in the protective multilayer 250, the structure may be annealed, for example to a temperature of about 150-200° C. for about 1 hour. This will result in some mixing of the metal and DLC at the film interfaces. If the annealing is done in air, and the outermost film is a metal, then at least a portion of the outermost metal film may be oxidized, for example it may have a metal oxide surface. Also, it has been discovered that if the DLC films have a thickness less than 8 Å the annealing may cause the carbon to vaporize. This may be because at such small thicknesses the carbon is present primarily as $sp^2$ carbon atoms, but at thicknesses greater than about 8 Å the carbon is present primarily as $sp^3$ carbon atoms.

Figure 6A:
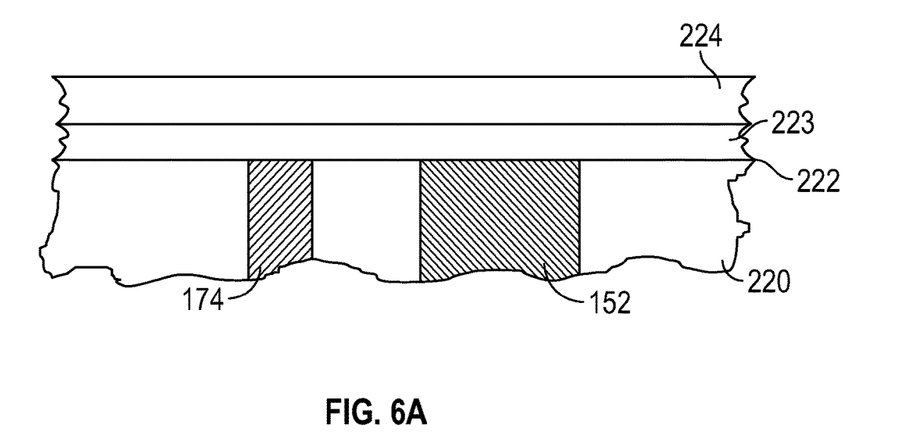
FIGS. 6A-6F are sectional views illustrating the basic process steps in forming the protective multilayer according to an embodiment of the invention wherein the slider overcoat has been removed in the window region.
Figure 6B:
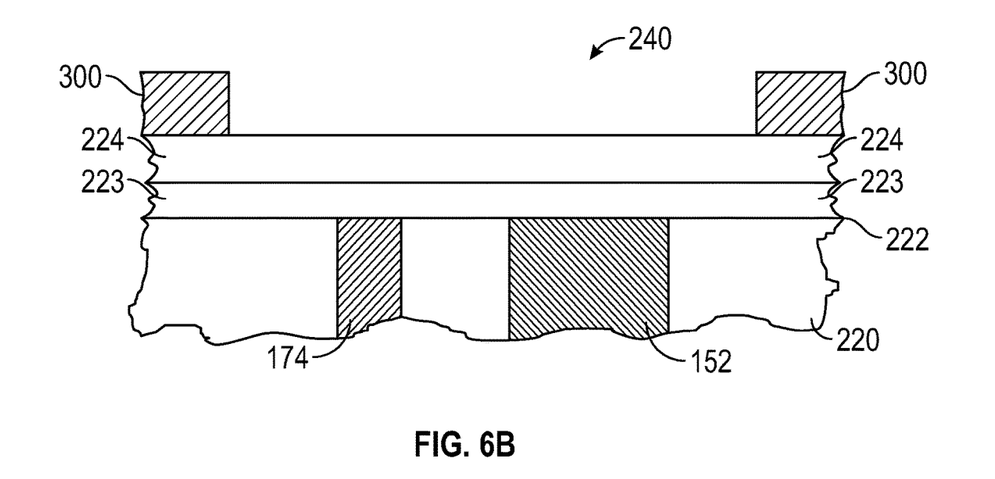

FIGS. 6A-6F are sectional views illustrating the basic process steps in forming the protective multilayer according to an embodiment of the invention wherein the slider overcoat has been removed in the window region. FIGS. 6A-6B illustrate the same steps as shown in FIGS. 5A-5B.

Figure 6C:
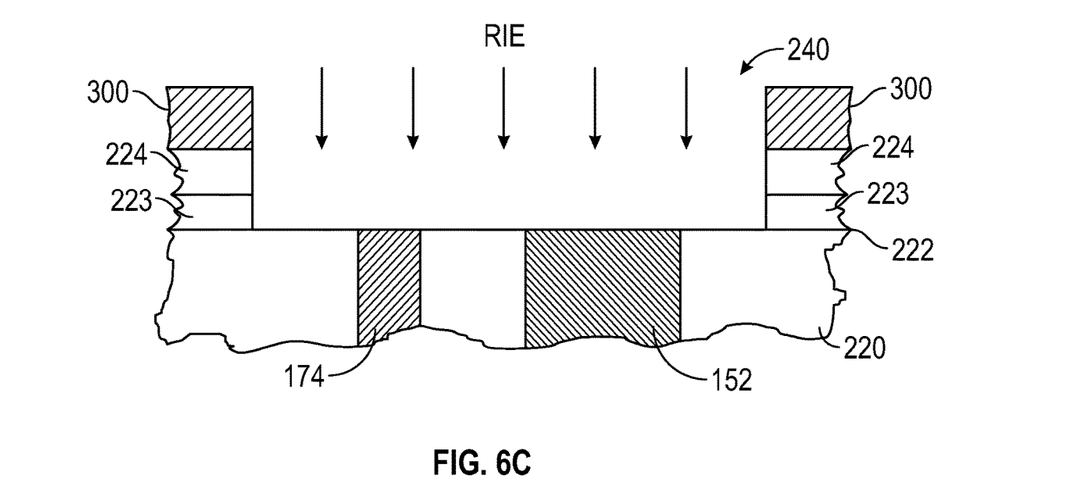

However, in FIG. 6C the undercoat 223 and slider overcoat 224 in window region 240 are removed, for example by reactive ion etching (RIE) in an Ar—$N_2$ or Ar—$O_2$ atmosphere. Because the etch rates of the undercoat 223 and overcoat 224 material are well known, the etching can be terminated at the precise time to remove the overcoat 224 material and all of the undercoat 223 without etching any of the NFT 174 material (typically Au or a Au alloy) or write pole 152 material (typically CoFe or CoFeNi alloy). One reason for removal of the slider overcoat 224 in the window region 240 is that the undercoat 223 material, while it may provide good adhesion between the slider 220 and the overcoat 224, may not provide good adhesion between the NFT end 274 (which is typically Au or a Au alloy) and the overcoat 224.

Figure 6D:
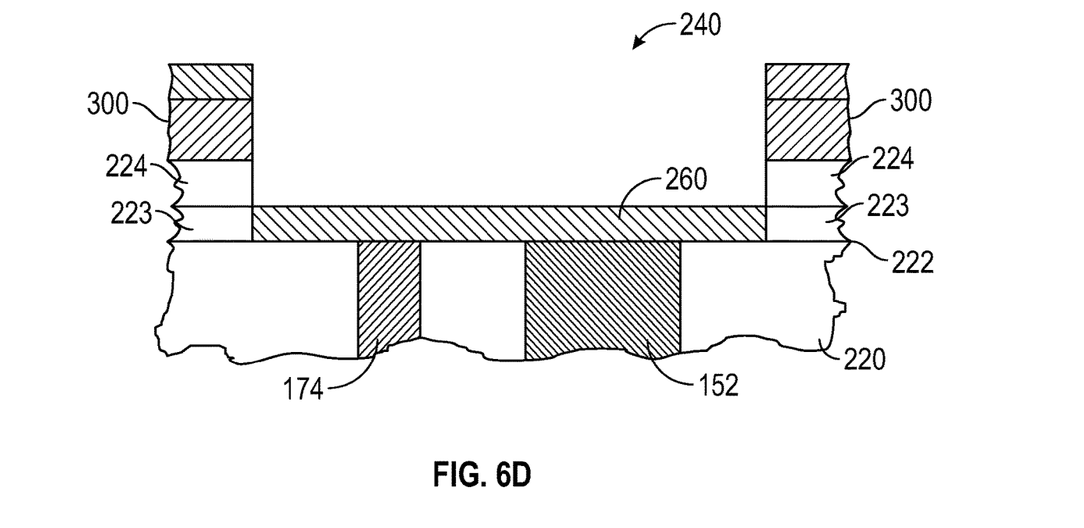

Next, in FIG. 6D, an adhesion film 260 is deposited, for example by sputter deposition, to the desired thickness, typically between about 1 and 10 Å and preferably at least 3 Å. The adhesion film may be formed from a NiCr alloy or oxides of Cr (CrOx), Ta (TaOx), Ti (TiOx), indium tin (ITO) or NiCr (NiCrOx) and provides good adhesion to the Au or Au alloy material of the NFT end 174. For an ITO adhesion film the sputtering target may be $In_2O_3$ (90 wt %) and $SnO_2$ (10 wt %). For a NiCrOx adhesion film the sputtering target may be a cermet of chromium oxide ($Cr_2O_3$) (80 wt %) and $Ni_{80}Cr_{20}$ alloy (20 wt %). The adhesion film 260 would also be a cermet film of ($Cr_2O_3$) as the ceramic and Ni and Cr as the metal.

Figure 6E:
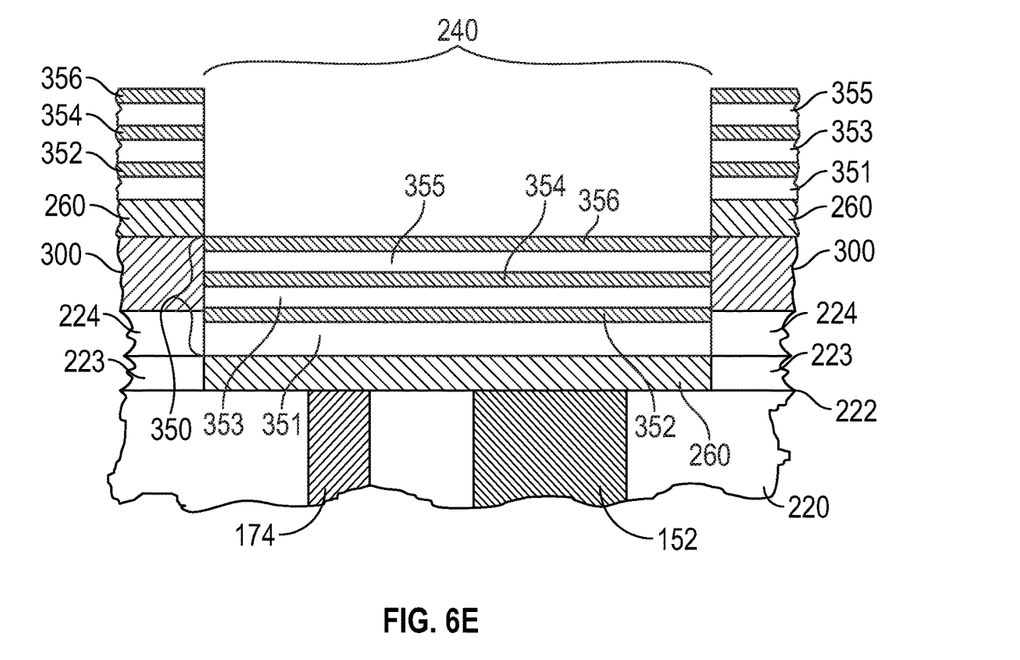

Next, in FIG. 6E the films making up protective multilayer 350 are deposited. The multilayer 350 is depicted as alternating DLC films 351, 353, 355 and metal (preferably Zr) films 352, 354, 356. In this embodiment because the protective overcoat 224 has been removed in the window region 240, the total thickness of multilayer 350 can be made thicker than in the embodiment where the slider overcoat 224 has not been removed (FIG. 5D). Preferably the first film deposited on adhesion film 260 is a DLC film, but alternatively a metal film may be the first film on adhesion film 260. Also, the outermost film may be a DLC film rather than a metal film.

Figure 6F:
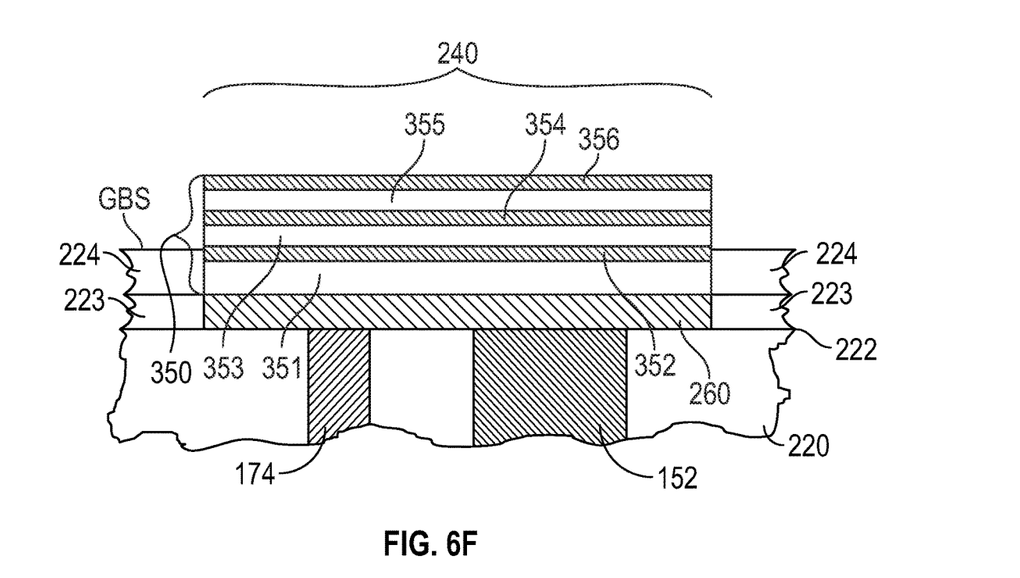

In FIG. 6F, the resist 300 and overlying metal and DLC material has been removed. The protective multilayer 350 is depicted as extending beyond the GBS of slider 220. Following the deposition of the films in the protective multilayer 350, the structure may be annealed, as described above with respect to FIGS. 5A-5D.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer, the head comprising:
    a head carrier having a surface for facing a recording layer;
    a write pole on the head carrier and having an end at the recording-layer-facing surface;
    an optical waveguide on the head carrier for receipt of laser radiation;
    a near-field transducer (NFT) on the head carrier for optical coupling with the waveguide, the NFT having an output end at the recording-layer-facing surface;
    wherein the recording-layer-facing surface of the head carrier comprises a window region surrounding the NFT output end and write pole end, and a non-window region; and
    a protective multilayer on the NFT output end and write pole end, the protective multilayer comprising alternating films of a metal and diamond-like carbon (DLC), the protective multilayer comprising at least two metal films, all of the metal films being formed of the same metal selected from Ti, Zr, Hf, V, Nb, Ta, Cr, Mo and W.

2. The HAMR head of claim 1 wherein the protective multilayer comprises at least three metal films and at least two DLC films.

3. The HAMR head of claim 1 wherein the protective multilayer film furthest from the recording-layer-facing surface is a metal film.

4. The HAMR head of claim 3 wherein at least a portion of the metal film furthest from the recording-layer-facing surface is oxidized.

5. The HAMR head of claim 1 wherein the metal films are formed of Zr.

6. The HAMR head of claim 1 further comprising an adhesion film in contact with the recording-layer-facing surface in the window region, wherein the adhesion film is between the multilayer and the NFT output end and write pole end.

7. The HAMR head of claim 6 wherein the adhesion film is selected from NiCr, CrOx, TaOx, TiOx, indium-tin-oxide (ITO) and NiCrOx.

8. The HAMR head of claim 7 wherein the NiCrOx adhesion film comprises a cermet of $Cr_2O_3$ and Ni and Cr.

9. The HAMR head of claim 7 wherein the ITO adhesion film comprises $In_2O_3$ and $SnO_2$.

10. The HAMR head of claim 1 further comprising an undercoat for a protective slider overcoat in contact with the recording-layer-facing surface in the window region and a protective slider overcoat in contact with the undercoat, wherein the multilayer is in contact with the overcoat.

11. The HAMR head of claim 10 wherein the overcoat comprises diamond-like carbon (DLC).

12. The HAMR head of claim 10 wherein the undercoat is also in contact with the recording-layer-facing surface in the non-window region and the protective slider overcoat is in contact with the undercoat in the non-window region.

13. The HAMR head of claim 1 wherein all the DLC films have a thickness equal to or greater than 8 Å.

14. The HAMR head of claim 1 wherein all the metal films have a thickness equal to or greater than 1 Å and less than or equal to 5 Å.

15. The HAMR head of claim 1 wherein the NFT output end at the recording-layer facing surface is formed as an E-antenna having a center output tip that faces the write pole.

16. The HAMR head of claim 1 wherein the NFT output end at the recording-layer facing surface is formed as a nanobeak antenna having a generally triangular shaped output tip with an apex of the triangle facing the write pole.

17. The HAMR head of claim 1 further comprising a magnetoresistive read head on the head carrier.

18. A heat-assisted recording (HAMR) disk drive comprising:
    the HAMR head of claim 1;
    a laser for directing light to the waveguide; and
    a magnetic recording disk having a magnetic recording layer.

19. A heat-assisted magnetic recording (HAMR) head for writing to a magnetic recording layer comprising:
    a head carrier having a surface for facing a recording layer;
    a write pole on the head carrier and having an end at the recording-layer-facing surface;
    an optical waveguide on the head carrier for receipt of laser radiation;
    a near-field transducer (NFT) on the head carrier for optical coupling with the waveguide, the NFT having an output end at the recording-layer-facing surface;
    wherein the recording-layer-facing surface of the head carrier comprises a window region surrounding the NFT output end and write pole end, and a non-window region;
    an overcoat on both the window region and the non-window region; and
    a protective multilayer on the overcoat only in the window region, the protective multilayer comprising alternating films of a metal and diamond-like carbon (DLC), the protective multilayer comprising at least two metal films, all of the metal films being formed of the same metal selected from Ti, Zr, Hf, V, Nb, Ta, Cr, Mo and W.

20. The HAMR head of claim 19 wherein the protective multilayer comprises at least three metal films and at least two DLC films.

21. The HAMR head of claim 19 wherein the protective multilayer film furthest from the recording-layer-facing surface is a metal film.

22. The HAMR head of claim 21 wherein at least a portion of the metal film furthest from the recording-layer-facing surface is oxidized.

23. The HAMR head of claim 19 wherein the overcoat comprises DLC and the multilayer film on the overcoat is a metal film.

24. The HAMR head of claim 19 wherein the overcoat comprises DLC and further comprising an undercoat selected from Si and SiNx between the recording-layer-facing-surface and the DLC overcoat.

25. The HAMR head of claim 19 wherein the metal films are formed of Zr.

26. The HAMR head of claim 19 wherein all the DLC films have a thickness equal to or greater than 8 Å.

27. The HAMR head of claim 19 wherein all the metal films have a thickness equal to or greater than 1 Å and less than or equal to 5 Å.

28. A head for writing to a magnetic recording layer in a heat-assisted magnetic recording (HAMR) disk drive, the head comprising:
   a gas-bearing slider having a surface for facing a recording layer on the disk;
   a write pole on the slider and having an end at the recording-layer-facing surface;
   an optical waveguide on the slider for receipt of laser radiation;
   a near-field transducer (NFT) on the slider for optical coupling with the waveguide, the NFT having an end at the recording-layer-facing surface;
   wherein the recording-layer-facing surface of the slider comprises a window region surrounding the NFT end and write pole end;
   an adhesion film in the window region in contact with the NFT end and write pole end, the adhesion film selected from NiCr, CrOx, TaOx, TiOx, indium-tin-oxide (ITO) and NiCrOx; and
   a protective multilayer on and in contact with the adhesion film, the protective multilayer comprising alternating films of Zr and diamond-like carbon (DLC).

29. The head of claim 28 wherein the multilayer film in contact with the adhesion film is a DLC film.

* * * * *